Sept. 21, 1948.  F. R. CLAFFORD  2,449,588
ADJUSTABLE PIPE UNION
Filed Aug. 13, 1946

Inventor
FLOYD R. CLAFFORD

Attorneys

Patented Sept. 21, 1948

2,449,588

UNITED STATES PATENT OFFICE 2,449,588

ADJUSTABLE PIPE UNION

Floyd R. Clafford, Park Ridge, Ill.

Application August 13, 1946, Serial No. 690,110

2 Claims. (Cl. 285—2)

The present invention relates to pipe unions and is more particularly concerned with an adjustable pipe union.

The primary object of the invention is to provide a device of the character referred to which will prevent the strain caused by use of an ordinary pipe union.

Strains are usually introduced on pipe lines by screw thread pipe fittings and cause premature failure of other pipe fittings, such as those related to stuffing boxes and valves, due to disruption of essential alignment. This device will obviate that fault.

Another object of the invention is to provide an adjustable union which will afford uniform tension or pressure on multiple piping, thus eliminating leaks caused by the distortion resulting from the aforesaid piping strains. They cause leaks in glands, headers, stuffing boxes, valves, gauges and other instruments.

Still another object of the invention is to produce an adjustable pipe union which will reduce maintenance costs and is of simpler and more compact contruction than prior devices.

With the foregoing and other objects and advantages in view the invention consists of the novel construction and arrangement of parts hereinafter described and claimed.

In the accompanying drawings illustrating the invention,

Like numerals, as used in the description and drawings, designate the same parts of construction.

Figure 1:
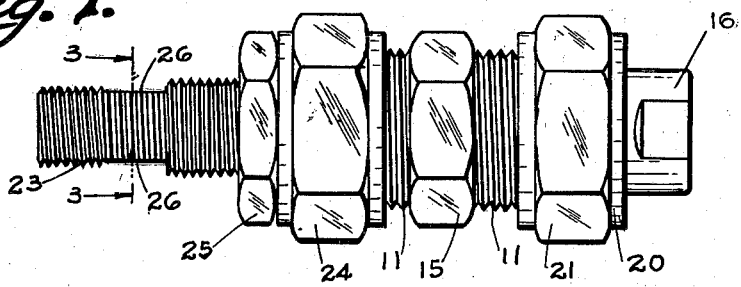
Figure 1 is a side elevation of the device.
Figure 2:
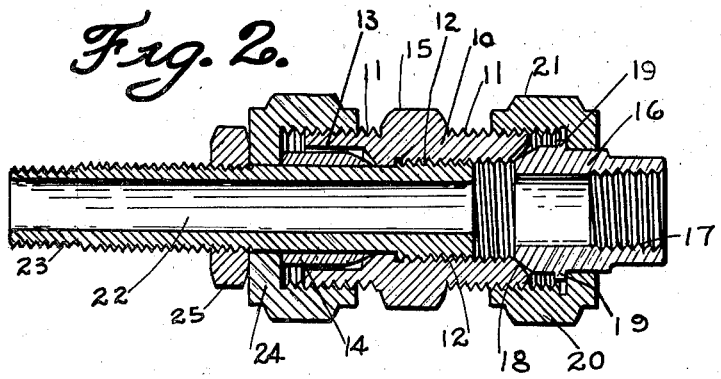
Figure 2 is a longitudinal section thereof.
Figure 3:
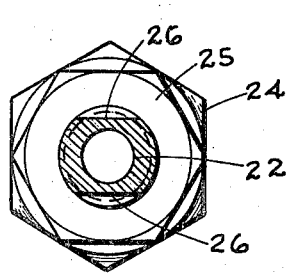
Figure 3 is a transverse section on line 3—3 of Figure 1.
Figure 4:
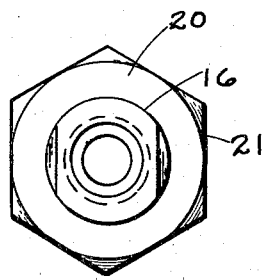
Figure 4 is an end elevation of the device.

10 is the barrel of the pipe union and comprises a tubular element straight threaded externally at each end, as at 11. It is also threaded internally at one end, as at 12. At the opposite end the bore is cut away, as at 13, so as to provide an annular recess to contain a copper bushing 14. Intermediate threaded portions 11 the barrel is formed with an hexagonal enlargement 15 to hold a pipe wrench. Contiguous to the internal threads 12, the barrel is provided with a bevel to the outer end.

Seated freely in the bevel is a beveled tubular tail piece or pipe 16 with exterior flats adjacent the outer end to provide a wrench hold. This end is a female element threaded internally, as at 17. The bevel 18 on the tail piece is more acute than the bevel in the barrel end and there is a slight clearance between the tail piece and the opening in the body. Exteriorly the tail piece has a circular flange 19. A tail piece union nut 20, with an hexagonal exterior 21, is provided with interior threads designed to engage the threads 11 on the outside of this end of barrel 10.

Between the interior threads of the tail piece nut and the outer end, the bore of said nut is constricted and smooth to fit freely on the tail piece and impinge the flange thereof. The internal diameter of the tail piece nut, where the threads occur, is sufficient to provide clearance for said flange and the adjacent end of the tail piece. By the aforegoing construction of tail piece and securing nut, a connection is produced which will function like a ball and socket union, thus preventing piping strain in the event of distortions of the pipe line from coaxial alignment.

Threading into the barrel 10 from the opposite end is an end of a tubular member or pipe 22, the bore of which is somewhat less in diameter than the bore of tail piece 16. It is of pipe size with a male thread 23, externally, for a suitable distance from the outer end, the diameter of said threads being less than those which engage the barrel. Mounted on member 22 for free engagement with a smooth portion between the two threaded portions, is an hexagonal body union nut 24 threaded interiorly to engage the adjacent threads on the barrel 10, with tolerance for purposes of adjustment. The interior end wall of nut 24 impinges the contiguous end of copper bushing 14 mounted within the annular recess 13 of the barrel 10 and serves to force same into said recess resulting in causing a seal to be made between the beveled end of said bushing and adjacent beveled surface at bottom of recess as shown. Nut 24, together with bushing 14, further serves to hold tubular member 22 in proper coaxial alignment with barrel 10. The end of the bushing and the adjacent end of said recess may be beveled, as shown, to facilitate adjustment of the foregoing.

An adjusting lock nut 25, with hexagonal exterior surface, is threaded on member 22 to impinge the body union nut 24, thus serving in association with the nut 20, to fasten the assembly together as an operative unit. Diametrically disposed flats 26 on the member 22 intermediate the end and said lock nut 25, are provided for the application of a wrench to turn the said member on its threads. (The adjustment is accomplished by turning piece 22 in or out on threads at 12 thus reducing to zero any strain in the piping connected at 23 and 17.)

It will be understood that pipe connections are to be made with the outer ends of the two elements, namely, tail piece 16 and member 22.

This device is useful on tailoring and laundry presses, valves, headers, gauges and fine instruments and it permits fine adjustments to eliminate piping strain.

As different embodiments may be made of this inventive concept and modifications may be made in the embodiment hereinbefore shown and described, it will be understood that the matter herein is to be interpreted as illustrative merely, and not in a limiting sense.

What I claim is:

1. A pipe union for connecting an end of a pipe to a tail pipe, comprising a tail piece nut adapted to be mounted upon said tail pipe, said nut for a portion of its length being interiorly threaded, a barrel exteriorly threaded for a portion of its length adjacent each of its ends adapted to be mounted upon said pipe, one of the threaded ends of said barrel being in threaded engagement with the threaded portion of said nut, a second nut adapted to be mounted for rotational movement upon said pipe, said last-named nut for a portion of its length being interiorly threaded, the threaded portion of said second-named nut being movable upon rotation into threaded engagement with the other threaded end of said barrel, and means for locking said second-named nut in position on said pipe.

2. A pipe union for connecting an end of a pipe to a tail pipe, comprising a tail piece nut adapted to be mounted upon said tail pipe, said nut for a portion of its length being interiorly threaded, a barrel exteriorly threaded for a portion of its length adjacent each of its ends adapted to be mounted upon said pipe, one of the threaded ends of said barrel being in threaded engagement with the threaded portion of said nut, a second nut adapted to be mounted for rotational movement upon said pipe, said last-named nut for a portion of its length being interiorly threaded, the threaded portion of said second-named nut being movable upon rotation into threaded engagement with the other threaded end of said barrel, said barrel being cut away contiguous to said other threaded end so as to provide an annular recess, a bushing surrounding said pipe and positioned within said recess for securing said second-named nut in coaxial alignment with said barrel, and means for locking said second-named nut in position on said pipe.

FLOYD R. CLAFFORD.

REFERENCES CITED

The following references are of record in the file of this patent:

FOREIGN PATENTS

| Number | Country | Date |
|---|---|---|
| 19,318 | Great Britain | July 28, 1900 |
| 166,976 | Great Britain | July 25, 1921 |